US006710545B2

(12) United States Patent
Yamaguchi et al.

(10) Patent No.: US 6,710,545 B2
(45) Date of Patent: Mar. 23, 2004

(54) DISCHARGE LAMP APPARATUS HAVING DIRECTLY COUPLED LAMP AND ELECTRONIC CONTROLLER

(75) Inventors: Hironao Yamaguchi, Gamagori (JP); Koichi Toyama, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/146,805

(22) Filed: May 17, 2002

(65) Prior Publication Data

US 2003/0006706 A1 Jan. 9, 2003

(30) Foreign Application Priority Data

Jul. 6, 2001 (JP) ....................................... 2001-206203

(51) Int. Cl.[7] .................................................. B60Q 1/02

(52) U.S. Cl. ........................... 315/82; 315/62; 362/265; 362/373

(58) Field of Search ............................. 313/17; 315/62, 315/82; 362/265, 61, 80, 373

(56) References Cited

U.S. PATENT DOCUMENTS 5,188,444 A * 2/1993 Makita et al. .............. 362/519
5,828,174 A 10/1998 Seiler et al. .................. 315/62
5,865,531 A 2/1999 Frey et al. .................. 362/373
5,917,287 A * 6/1999 Haederle et al. ............ 315/136
6,294,870 B1 * 9/2001 Kawashima et al. ........ 313/623
6,525,491 B2 * 2/2003 Huber et al. ................ 315/291
2001/0014022 A1 8/2001 Frey et al. .................. 362/373

FOREIGN PATENT DOCUMENTS

| | | |
|---|---|---|
| DE | 19831042 A1 | 2/2000 |
| EP | 1052447 A2 | 11/2000 |
| FR | 2704937 | 11/1994 |
| JP | A-10-228804 | 8/1998 |
| JP | A-2000-235809 | 8/2000 |

* cited by examiner

*Primary Examiner*—Tan Ho
(74) *Attorney, Agent, or Firm*—Posz & Bethards, PLC

(57) ABSTRACT

In a discharge lamp apparatus, a casing of an electronic controller unit for a discharge lamp is comprised of a resin casing and a metal casing and accommodates therein circuit components for generating a voltage supplied to the discharge lamp. The resin casing couples with and contacts with the connector part of the discharge lamp. A power MOS transistor is attached to the metal casing through a plate member made of an insulating material. With this arrangement, heat generated by the discharge lamp is less likely to transfer from the resin casing to the metal casing, and heat generated by the power MOS transistor is efficiently radiated from the metal casing to the outside.

20 Claims, 3 Drawing Sheets

DISCHARGE LAMP APPARATUS HAVING DIRECTLY COUPLED LAMP AND ELECTRONIC CONTROLLER

CROSS REFERENCE TO RELATED APPLICATION

This application is based on and incorporates herein by reference Japanese Patent Application No. 2001-206203 filed on Jul. 6, 2001.

FIELD OF THE INVENTION

The present invention relates to a discharge lamp apparatus that uses a discharge lamp as a light source, and particularly to an apparatus in which an electronic controller unit for applying a voltage to the discharge lamp is directly coupled with the discharge lamp.

BACKGROUND OF THE INVENTION

A discharge lamp apparatus that uses a discharge lamp as a light source is used as a vehicle headlight. An electronic controller unit that generates and controls a voltage applied to the discharge lamp includes a DC/DC converter for transforming an output voltage by switching an input voltage by a power device, a high voltage generation circuit for generating, from the output voltage of the DC/DC converter, a high voltage applied when lighting of the discharge lamp is initiated, and the like.

When the temperature of electronic circuit components forming the controller unit rises, it is likely that, for instance, the soldered part of the circuit components melt and the circuit components operate erroneously. In the discharge lamp apparatus disclosed in JP-A-2000-235809, a part of a metallic heat radiator thermally coupled with a circuit substrate mounting circuit components thereon is exposed outside a headlight so that the heat generated by the discharge lamp and the circuit components may be radiated to the outside of the headlight through the metallic heat radiator.

In the discharge lamp apparatus disclosed in JP-A-2000-235809, an igniter part and a lighting device need be connected by a harness. This increases the number of component parts, complicates assembling work and adds manufacturing cost.

It is therefore proposed to directly couple and electrically connect the discharge lamp and the controller unit. However, if the discharge lamp and the controller unit are directly coupled and the controller unit is disposed near the discharge lamp, the internal temperature of the controller unit rises due to heat transferred or radiated from the discharge lamp and the heat generated by the controller unit itself. This is likely to cause erroneous operation of the circuit components in the controller unit.

SUMMARY OF THE INVENTION

It is therefore an object of the present invention to provide a discharge lamp apparatus that uses no high voltage wire nor high voltage connector and suppress rise of temperature of an electronic controller unit.

In a discharge lamp apparatus according to the present invention, a discharge lamp and an electronic controller unit for applying a voltage to the discharge lamp are directly coupled with and electrically connected to the discharge lamp. Therefore, a high voltage connector and a high voltage wire for connecting the discharge lamp and the controller unit are not necessitated.

Preferably, a second casing mounting a power device of a DC/DC converter has a thermal conductivity higher than that of a first casing coupled with the discharge lamp. As a result, heat generated by the discharge lamp is less likely to be transferred from the first casing to the second casing, and the heat of the discharge lamp is less likely to be transferred circuit components mounted in the second casing.

In addition, heat generated by the power device of the DC/DC converter is more likely to be radiated to the outside of the second casing from the second casing that has the thermal conductivity higher than that of the first casing. Because the power device of the DC/DC converter generate more heat among the controller unit, the heat generated by the power device is readily radiated from the second casing to the outside of the second casing, thus suppressing rise of temperature of the circuit components in the controller unit including the power device. Thus, erroneous operation of the circuit components is prevented.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Various embodiments of the present invention is described hereinbelow with reference to the drawings.

(First Embodiment)

Figure 1:
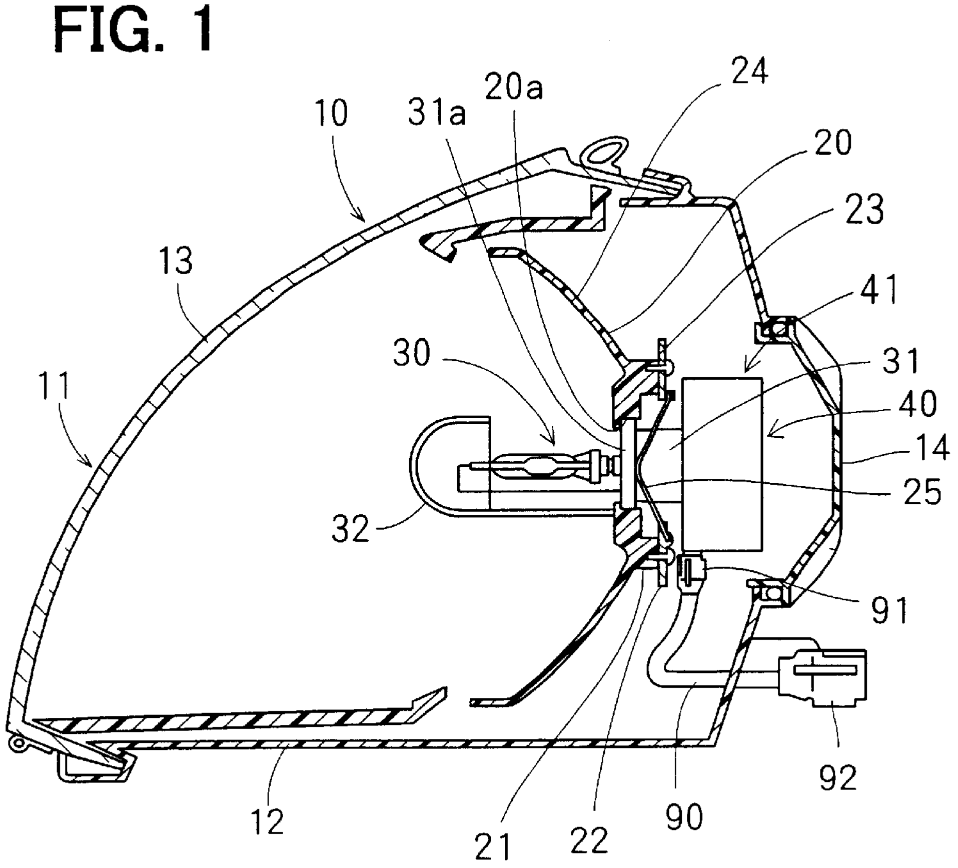
FIG. 1 is a sectional view showing a headlight using a discharge lamp apparatus according to the first embodiment of the present invention.

The first embodiment of the present invention in which a discharge lamp apparatus is applied as a headlight of a vehicle is shown in FIG. 1. A headlight 10 includes a headlight casing 11, a reflector 20, a discharge lamp 30 and an electronic controller unit 40. The casing 11 includes a casing body 12, a lens 13 and a cover 14, and accommodates the reflector 20, discharge lamp 30 and the controller unit 40. The discharge lamp 30 and the controller unit 40 form a discharge lamp apparatus. A power supply cord 90 connects to the controller unit 40 through a connector 91 and to a battery power source 15 shown in FIG. 3 through a connector 92. When a driver turns on a switch 16, the voltage of the battery power source 15 is supplied to the controller unit 40 so that a voltage for activating the discharge lamp 30 is generated.

As shown in FIG. 1, the reflector 20 is supported movably by the casing body 12 through a supporting member (not shown) that has a mechanism capable of adjusting the optical axis of the reflector 20. The reflector 20 is made of resin and shaped configured in a bowl shape. A reflector 20 is formed with a reflection layer on its concave reflection surface to reflect light of the discharge lamp 30 forward.

The discharge lamp 30 is fit in a through hole 20*a* of the reflector 20. A shape 32 is provided to shut off direct light of the discharge lamp 30 projected in the forward direction. Metallic support fittings 22 and 23 are attached to the upper part and lower part of a supporting part 21 formed around the outer periphery of the through hole 20*a*. A spring 25 is configured in a U-shape and rotatably attached to the lower metallic fitting 22. Both ends of the U-shape of the spring 25 are hooked to the upper metallic fitting 23 so that the spring 25 presses the flange 31*a* of the connector part 31 of the discharge lamp 30 to the reflector 20 around the outer periphery of the through hole 20*a*.

The controller unit 40 includes an electric circuit for supplying a voltage to the discharge lamp 30. Under the condition that the discharge lamp 30 and the controller unit 40 are assembled as shown in FIG. 1, the discharge lamp 30 and the controller unit 40 are held contactless with the casing 11 and movable relative to the casing. Therefore, the optical axis of the discharge lamp 30 is adjustable manually or automatically.

Figure 2:
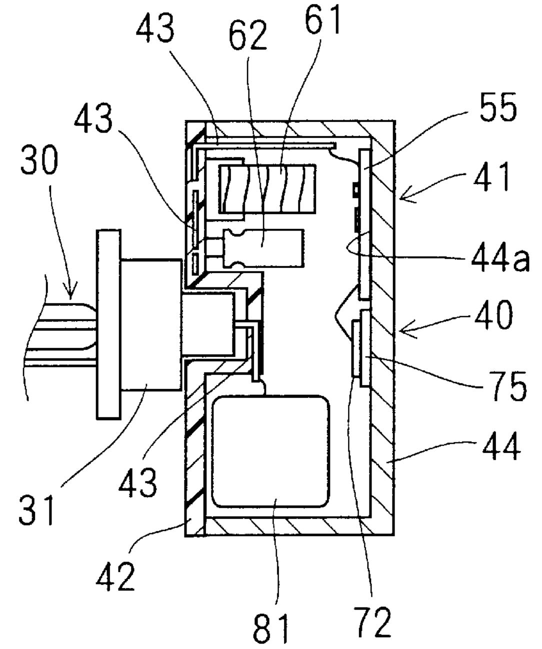
FIG. 2 is a schematic sectional view showing a discharge lamp and a controller unit in the first embodiment.

As shown in FIG. 2, the casing 41 of the controller unit 40 includes a resin casing 42 which is the first casing and a metal casing 44 which is the second casing, and accommodates circuit components therein. The thermal conductivity of the metal casing 44 is higher than that of the resin casing 42. Preferably, the metal casing 44 is made of a material that has a high thermal conductivity of more than 20 W/m·K, for instance, aluminum (thermal conductivity ≈200 W/m·K), aluminum alloy (thermal conductivity ≈72 W/m·K), iron (thermal conductivity ≈50 W/m·K), copper (thermal conductivity ≈400 W/m·K) or magnesium alloy (thermal conductivity ≈65 W/m·K). Because the controller unit 40 is moved to adjust the optical axis through the reflector 20, aluminum alloy that is light in weight is more preferable for simplifying the optical axis adjusting mechanism. The resin casing 42 is coupled and in contact with the connector part 31 of the discharge lamp 30. A coil 61, an electrolytic capacitor 62 and a high voltage coil 81 are electrically connected to terminals 43 insert-molded in the resin casing 42.

A circuit board 55 and a plate member 75 made of an insulating material such as aluminum nitride are bonded to the inside bottom surface or the inside opposing surface of the metal casing 44 that faces the discharge lamp 30. The thermal resistance of the plate member 75 is lower than that of air. A power MOS transistor 72 of a DC/DC converter 70 is soldered to the plate member 75. The power MOS transistor 72 used as the power device is in the form of a bare chip which has its terminal exposed to the side of metal casing 44.

Figure 3:
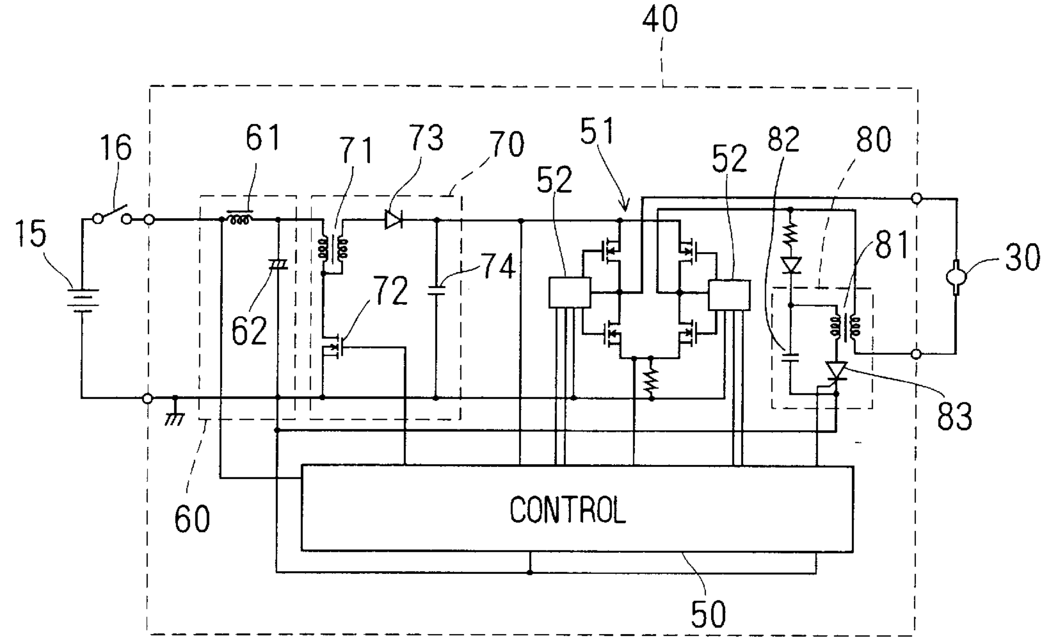
FIG. 3 is a circuit diagram showing the controller unit in the first embodiment.

As shown in FIG. 3, the controller unit 40 includes a control circuit 50, H-bridge circuit 51, filter circuit 60, DC/DC converter 70 and high voltage generation circuit 80. The control circuit 50 comprises semiconductor devices which control circuit components in the controller unit 40. A driver 52 turns on and off the power MOS transistor of the H-bridge circuit 51 based on the switching signal applied from the control circuit 50 to inverter-control the H-bridge circuit 51 so that the voltage applied to the discharge lamp 30 is inverted into a pulse waveform. The control circuit 50, H-bridge circuit 51 and driver 52 are mounted on the circuit substrate 55. The filter circuit 60 comprises the coil 61 and the electrolytic capacitor 62 and smoothes the power source voltage supplied from the battery power source 15.

The DC/DC converter 70 comprises a DC/DC transformer 71, power MOS transistor 72 which is a power device, diode 73 and capacitor 74 to boost the power source voltage. The control circuit 50 controls the duty ratio of the switching signal applied to the power MOS transistor 72 to control the electric power supplied to the discharge lamp 30 from the DC/DC converter 70. The diode 73 and the capacitor 74 rectify and smooth the induced voltage generated at the secondary coil side of the DC/DC transformer 71. The high voltage generation circuit 80 comprises a high voltage coil 81, capacitor 82 and thyristor 83. The high voltage coil 81 generates a starting voltage for initiating lighting of the discharge lamp 30. The capacitor 82 charges the current supplied to the primary coil side of the high voltage coil 81. The thyristor 83 controls discharging of the capacitor 82.

The discharge lamp 30 and the power MOS transistor 72 generate a large amount of heat during lighting operation of the discharge lamp 30. However, because the thermal conductivity of the resin casing 42 is low, heat generated by the discharge lamp 30 is less likely to transfer from the resin casing 42 and the metal casing 44. Further, because the metal casing 44 has a high thermal conductivity, heat generated by the power MOS transistor 72 is radiated efficiently from the metal casing 44 to the outside of the casing 44. As a result, it is less likely that the heat generated by the discharge lamp 30 and the power MOS transistor 72 is transferred to the circuit components provided inside the controller unit 40. Thus, temperature rise of the circuit components inside the controller unit 40 including the power MOS transistor 72 is limited, and erroneous operation of the circuit components are restricted.

The power MOS transistor 72 is disposed on the inside opposing surface 44*a* of the metal casing 44 in a manner to face the discharge lamp 30, and spaced apart from the discharge lamp 30. Further, the thermal resistance of the plate member 75 is lower than that of air present between the power MOS transistor 72 and the discharge lamp 30. As a result, the heat generated by the power MOS transistor 72 is transferred to the metal casing 44 from the plate member 75 and radiated from the metal casing 44 to the outside of the same.

(Second Embodiment)

Figure 4:
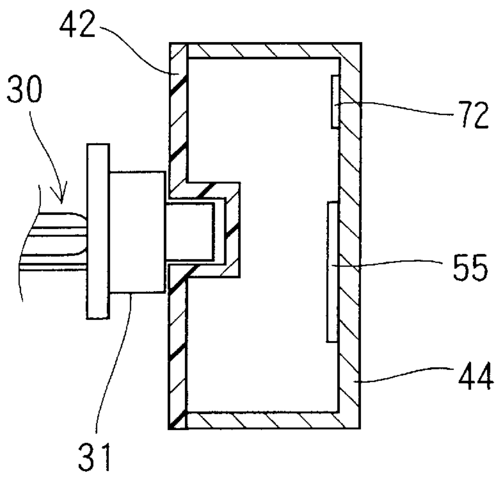
FIG. 4 is a schematic sectional view showing a discharge lamp and a controller unit in the second embodiment.

In the second embodiment shown in FIG. 4, the power MOS transistor 72 of the DC/DC converter is in the form of a bare chip or a resin-molded chip in which the terminal is not exposed on the surface contacting the metal casing 44. As a result, the power MOS transistor 72 is attached in direct contact to the metal casing 44.

(Third Embodiment)

Figure 5:
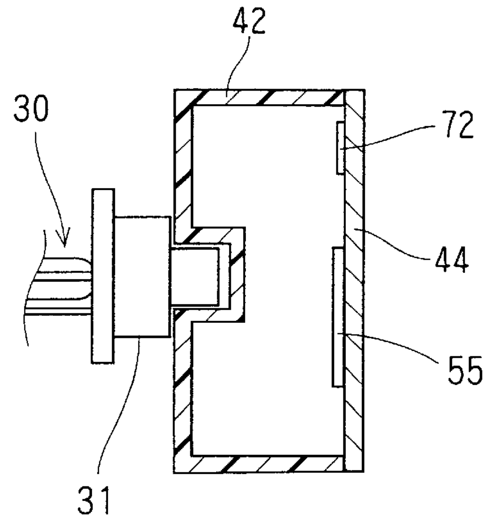
FIG. 5 is a schematic sectional view showing a discharge lamp and a controller unit in the third embodiment.

In the third embodiment shown in FIG. 5, the casing comprises the box-shaped resin casing 42 as the first casing and the plate-shaped metal casing 44 as the second casing. The resin casing 42 is coupled with the connector part 31 of the discharge lamp 30, and the circuit board 55 and the power MOS transistor 72 are attached to the metal casing 44.

(Fourth Embodiment)

Figure 6:
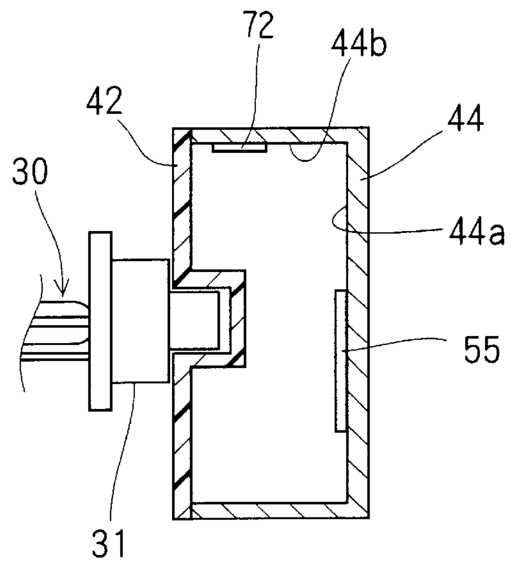
FIG. 6 is a schematic sectional view showing a discharge lamp and a controller unit in the fourth embodiment.

In the fourth embodiment shown in FIG. 6, the power MOS transistor 72 is not attached to the inside opposing surface 44*a* of the metal casing 44 facing the resin casing 42 but is attached to an inside side surface 44*b*.

(Fifth Embodiment)

Figure 7:
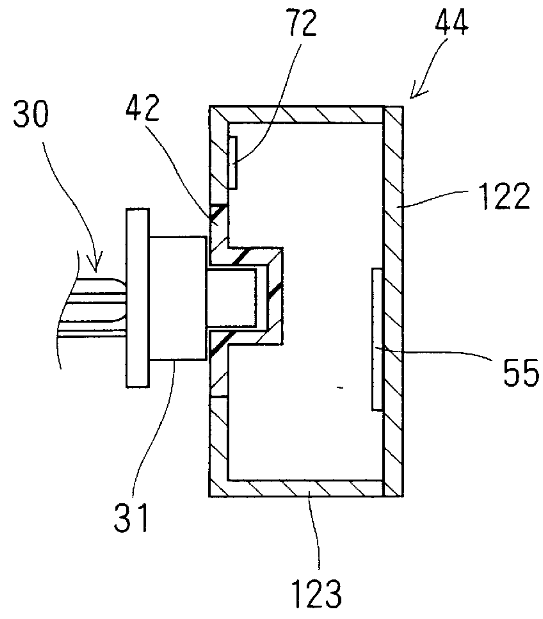
FIG. 7 is a schematic sectional view showing a discharge lamp and a controller unit in the fifth embodiment.

In the fifth embodiment shown in FIG. 7, the resin casing 42 is provided as the first casing only around the connector part 31 of the discharge lamp 30. The metal casing 44 is formed as the second casing with two metal casings 122 and 123. The power MOS transistor 72 is attached to the metal casing 123 which is on the same plane as the resin casing 42.

(Sixth Embodiment)

Figure 8:
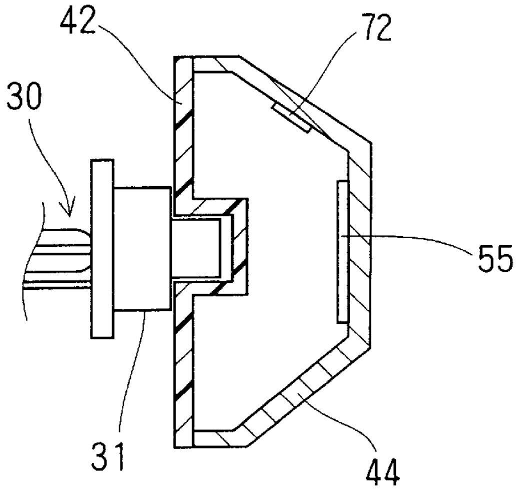
FIG. 8 is a schematic sectional view showing a discharge lamp and a controller unit in the sixth embodiment.

In the sixth embodiment shown in FIG. 8, the metal casing 44 as the second casing has a surface inclined relative to the resin casing 42. The power MOS transistor 72 is attached to the inclined surface.

(Seventh Embodiment)

Figure 9:
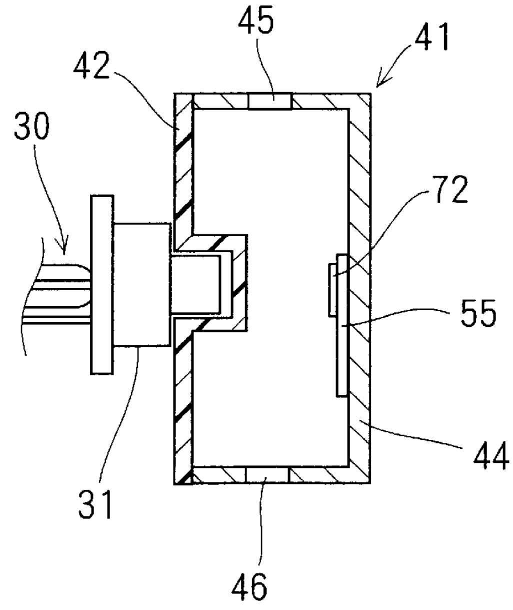
FIG. 9 is a schematic sectional view showing a discharge lamp and a controller unit in the seventh embodiment.

In the seventh embodiment shown in FIG. 9, the power MOS transistor 72 is mounted on the circuit board 55. The metal casing 44 is formed with an upper air passage hole 45 and a lower air passage hole 46 as air vents, so that air readily flows in the casing 41. In the seventh embodiment, in particular, because the air vents are formed at both upper and lower parts of the metal casing 45, heated air readily flows out to the outside of the casing 41 through the upper air passage hole 45 and outside air readily flows in the inside of the casing 41 through the lower air passage hole 46. As a result, temperature of air in the casing 41 is restricted from rising. Further, the air flowing through the casing 41 cools the power MOS transistor 72.

In the above embodiments of the present invention, the discharge lamp 30 is attached to the resin casing having a low thermal conductivity and the power MOS transistor of the DC/DC converter 70 is attached to the metal casing having a thermal conductivity higher than that of the resin casing. As a result, heat of the discharge lamp 30 is restricted from transferring to the circuit components in the casing unit that includes the power MOS transistor of the DC/DC converter. In addition, heat of the power MOS transistor is efficiently radiated from the metal casing to the outside of the metal casing. Thus, temperature of the circuit components in the controller unit including the power MOS transistor is restricted from rising, and erroneous operation of the circuit components is also restricted.

In the above embodiment, the first casing which connects to the discharge lamp 30 is made of resin and the second casing which mounts the power MOS transistor is made of metal. However, the materials are not limited as long as the thermal conductivity of the second casing is higher than that of the first casing.

What is claimed is:

1. A discharge lamp apparatus comprising:

a discharge lamp; and an electronic controller unit directly coupled with and electrically connected to the discharge lamp for supplying a voltage to the discharge lamp, wherein the controller unit has a plurality of electronic circuit components including a power device of a DC/DC converter and a casing unit coupled with the discharge lamp and accommodating the electronic circuit components, and wherein the casing unit has a first casing coupled with the discharge lamp and a second casing mounting the power device thereon and having a thermal conductivity higher than that of the first casing.

2. The discharge lamp apparatus of claim 1, wherein the first casing is made of resin and the second casing is made of metal.

3. The discharge lamp apparatus of claim 2, wherein the second casing is made of either aluminum, aluminum alloy, iron, copper or magnesium alloy.

4. The discharge lamp apparatus of claim 2, wherein the power device of the DC/DC converter is attached to the second casing.

5. The discharge lamp apparatus of claim 2, wherein the power device of the DC/DC converter is attached to an inside side surface of the second casing.

6. The discharge lamp apparatus of claim 2, wherein the first casing surrounds a connector part of the discharge lamp.

7. The discharge lamp apparatus of claim 2, wherein the second casing further comprises a plurality of casings.

8. The discharge lamp apparatus of claim 7, wherein the power device of the DC/DC converter is attached to one of the plurality of casings that is co-planar with the first casing.

9. The discharge lamp apparatus of claim 2, wherein the second casing has a surface inclined relative to the first casing.

10. The discharge lamp apparatus of claim 9, wherein the power device of the DC/DC converter is attached to the inclined surface.

11. The discharge lamp apparatus of claim 2, wherein the second casing is formed with at least one air passage hole as an air vent, so that air readily flows in the casing unit.

12. The discharge lamp apparatus of claim 1, wherein the electronic controller unit further has an insulator provided between the power device and the second casing.

13. The discharge lamp apparatus of claim 12, wherein a thermal resistance between the power device and the second casing through the insulator is lower than that between the power device and the first casing through air.

14. The discharge lamp apparatus of claim 12, wherein the insulator further comprises a plurality of insulators.

15. The discharge lamp apparatus of claim 14, wherein at least one of the plurality of insulators is made of aluminum nitride.

16. The discharge lamp apparatus of claim 14, wherein at least one of the plurality of insulators and the power device of the DC/DC converter are attached to the second casing.

17. The discharge lamp apparatus of claim 12, wherein the insulator is bonded to one of an inside bottom surface and an inside opposing surface of the second casing facing the discharge lamp.

18. The discharge lamp apparatus of claim 1, wherein the control unit has a high voltage generation circuit for generating, from the output voltage of the DC/DC converter, a high voltage applied to the discharge lamp when lighting of the discharge lamp is initiated, a control circuit for controlling electric power to the discharge lamp by turning on and off the power device.

19. The discharge lamp apparatus of claim 1, further comprising a headlight casing of a vehicle headlight accommodating the discharge lamp and the electronic controller unit therein.

20. The discharge lamp apparatus of claim 1, wherein the discharge lamp and the electronic controller unit are held contactless with the casing unit and movable relative to the casing unit.

* * * * *